(12) United States Patent
Brusius (10) Patent No.: US 6,622,390 B2
(45) Date of Patent: Sep. 23, 2003

(54) METHOD AND APPARATUS FOR INSTALLATION AND ALIGNMENT OF AIR DATA SENSING PROBE

(75) Inventor: Nathan T. Brusius, Woodbury, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 0 days.

(21) Appl. No.: 09/982,050

(22) Filed: Oct. 16, 2001

(65) Prior Publication Data

US 2003/0041465 A1 Mar. 6, 2003

Related U.S. Application Data (60) Provisional application No. 60/315,628, filed on Aug. 29, 2001.

(51) Int. Cl.[7] ............................................. G01C 15/00
(52) U.S. Cl. ............................. 33/286; 33/645; 33/333; 33/613
(58) Field of Search .................... 33/286, 533, 613, 33/645, 276–278, 333–334, 365, 370, 371, 384, 366.11

(56) References Cited

U.S. PATENT DOCUMENTS

| | | | | |
|---|---|---|---|---|
| 3,612,949 A | * | 10/1971 | Becraft et al. ................ | 33/286 |
| 4,125,944 A | * | 11/1978 | Esposito et al. ............... | 33/334 |
| 4,378,696 A | * | 4/1983 | DeLeo et al. .................. | 73/180 |
| 4,694,584 A | * | 9/1987 | Mills ........................ | 33/366.13 |
| 5,029,051 A | * | 7/1991 | Shirai et al. ................... | 33/365 |
| 5,586,393 A | * | 12/1996 | Pherigo et al. ................ | 33/288 |
| 5,761,818 A | * | 6/1998 | Hopkins et al. .......... | 33/366.14 |
| 6,305,218 B1 | * | 10/2001 | Foster ....................... | 73/178 R |

* cited by examiner

*Primary Examiner*—Diego Gutierrez
*Assistant Examiner*—Yaritza Guadalupe
(74) *Attorney, Agent, or Firm*—Westman, Champlin & Kelly, P.A.

(57) ABSTRACT

An alignment tool is used for aligning an air data sensing probe relative to an aircraft axis has an alignment tool mounting plate that fits over the air data sensing probe base plate and is doweled in position on the air data sensing probe base plate. The alignment tool has a level and incline indicator positioned at a known relation to an axis of the air data sensing probe. The probe base plate and alignment tool are mounted on the aircraft, and the level and incline indicator is used to determine when an aligned position of the air data sensing probe is reached by rotating the alignment tool and probe base plate. The probe base plate of the probe is then fixed in position, and the alignment tool is removed. Bores are formed in the aircraft wall for holding dowel pins extending between the aircraft wall and the probe base plate.

21 Claims, 7 Drawing Sheets

METHOD AND APPARATUS FOR INSTALLATION AND ALIGNMENT OF AIR DATA SENSING PROBE

The present application is based on and claims the benefit of priority of U.S. provisional patent application Ser. No. 60/315,628, filed Aug. 29, 2001, the content of which is hereby incorporated by reference in its entirety.

BACKGROUND OF THE INVENTION

The present invention relates to an alignment apparatus for aligning an air data sensing probe and a method of using the apparatus when the probe is in place on a previously leveled aircraft. A tool is installed on the probe base plate in a known position relative to the probe axis. The tool carries an angle indicator to provide an indication when the probe axis is properly aligned relative to a horizontal or level axis. In one form, an elongated support on the tool has indicators to establish a reference line that is leveled using an external reference, such as a laser beam or an optical line. A second form of the tool has a digital inclinometer installed thereon for directly indicating angular position. The probe and the apparatus are rotated to a position where the indicator is at the desired position, and the probe is then at a known angular position relative to the aircraft axis for measuring angle of attack of the aircraft.

When using a multifunction air data sensing probe which measures pitot and static pressures and Angle of Attack, it is critical to obtain the proper alignment or relationship of the probe axis and the aircraft longitudinal plane. The mounting of the probe must be consistent for repeatability of angle of attack measurements and also should allow interchangeability of probes to reduce maintenance efforts.

It has been known to use machined dowel pins that fit closely into bores for indexing parts on the aircraft body. The dowel pins located and installed during the alignment procedure can be left as the aircraft wall. When a probe is removed and replaced, or when a different probe is replaced onto the aircraft, it is located with the dowel pins on the aircraft wall or plate placed in the bores on the probe base plate, and the probe is then at a known aligned position.

However, getting the initial probe alignment correct relative to the aircraft longitudinal axis or flight reference axis has been a problem, and if the bores for the dowel pins or the dowel pins themselves are not very precisely positioned so the probe is not properly aligned, the ability to accurately measure angle of attack, in particular, is impaired.

SUMMARY OF THE INVENTION

The present invention relates to an apparatus for aligning air data sensing probes properly in relation to the central longitudinal axis (or aircraft flight reference axis) of an aircraft in the pitch measuring plane. Angle of attack measurements determine the change in the angle of the longitudinal axis of the barrel of a probe (and thus the change in the angle of a reference longitudinal axis of the aircraft) relative to a flight path axis or plane. The probe is oriented at a selected angle relative to the central or horizontal axis of the aircraft. The position of the axis of the probe is selected to be consistent for repeatable angle of attack measurements.

In many instances, a zero angle of attack is where the probe axis actually is inclined relative to a flight path axis or plane of the aircraft. The angular difference between a horizontal reference plane when the longitudinal axis of the aircraft is horizontal and the axis of the barrel of the probe for correct angle of attack measurements is now determined by using wind tunnel tests or computational fluid dynamics. This difference angle is dependent upon the configuration of the aircraft. It can be different for different aircraft, but is repeatable between the same model of aircraft. This means that the correct orientation of the probe can be obtained by referencing the probe longitudinal axis to a horizontal plane, when the aircraft longitudinal axis is horizontal.

The present invention includes an alignment tool that mounts onto the base plate of a probe to be aligned and is held precisely positioned on the base plate with dowel pins. The probe is supported on an aircraft that has been previously leveled. Fasteners that pass through short, part annular slots on the probe base plate are avoided. The fasteners are adjusted to frictionally hold the probe from rotation under gravity but yet permit manually rotating the probe base for changing the angle of the longitudinal axis of the probe relative to the aircraft reference axis.

The alignment tool has a mounting plate that overlies at least a portion of the probe base plate and has an opening for clearance of the probe. The alignment tool mounting plate has dowel pins that fit into alignment bushings on the probe base plate for proper positioning of the tool, and the tool is secured so it can be rotated about a pitch axis with the probe base plate.

The probe base plate is guided on the mounting wall of the aircraft, as shown using thumb screws that pass through short slots on the probe base plate. Then the alignment tool and the probe are leveled with a leveling indicator. The leveling of the alignment tool is done by rotating the probe about the central axis of the probe base plate, which is normal to the pitch axis of the aircraft.

In one form shown, the alignment tool comprises an elongated rod mounted on the plate with circular disc members at the opposite ends of the rod. The rod protrudes in fore and aft direction both ahead of and behind the probe base plate, and suitable level indicator lines are provided on the circular disc members to provide markings or indicia that can be precisely oriented relative to a level laser beam or an optical line. Also, a tangent line on the lower surfaces of the end members is a level line. This level line is at a previously determined optimal angle relative to the axis of the probe, when the tool plate dowels are positioned in bushings on the probe base plate. The angle for the probe axis relative to a level plane can be found using wind tunnel tests or computational fluid dynamics and is aircraft dependent, as previously stated.

In a second form of the invention, a digital inclinometer is utilized for aligning the probe, and eliminates the need for a separate laser source and level spaced from the aircraft. The aircraft is still leveled, as an initial step, and then the alignment tool having a digital inclinometer mounted thereon is coupled to the air data sensor base plate, as in the first form of the invention. The alignment tool or fixture includes a tool mounting wall that is precisely positioned (with dowels) on the probe base plate. Dowel pins on the tool mounting wall fit into bores on the probe base plate for properly locating the tool as described before. The inclinometer is supported on an arm on the tool that permits orienting the inclinometer at different positions for providing an indication of "level" when aligning probes requiring different angular positions, the alignment tool thus can be used for aligning several different sensors.

Once the alignment tool mounting wall is doweled into place on the probe base plate of the aircraft instrument, and the air data sensor base plate is held on the aircraft, but without securing it in place, the digital inclinometer is oriented on its support arm appropriately for the particular air data sensor being aligned, and the air data sensor is rotated about a horizontal or pitch axis until the digital inclinometer indicates that a level position or a desired, slightly off level position in the pitch axis direction has been achieved.

The air data sensor or probe base plate is tightened in place, and a cover plate is installed, and after flight tests the alignment of the probe is rechecked as explained before permanently securing the air data sensor in place.

In all forms of the invention, once the tool mounting plate and the probe base plate have been rotated (the tool mounting plate and base plate are doweled or guided together so they move as a unit), so that the alignment tool or inclinometer indicates the appropriate alignment angle for the probe of the air data sensor, the probe is temporarily secured in place for flight test and the fixture or tool is then removed. After flight test and rechecking proper alignment, if needed, precisely sized holes or bores are drilled into the aircraft mounting wall or mounting plate through the alignment bushings that are provided on the tool plate flange or base. Dowel pins are then pressed into the holes in the aircraft wall and extend into the alignment bushings of the sensor base plate. Thereafter, any air data sensing probe having an appropriate base plate that is installed at this location on the dowel pins in the aircraft wall will be aligned correctly. The probe base plate alignment bushings are preferably stainless steel inserts that have precise diameter bores that will fit onto the dowel pins.

DETAILED DESCRIPTION OF THE ILLUSTRATIVE EMBODIMENTS

Figure 1:
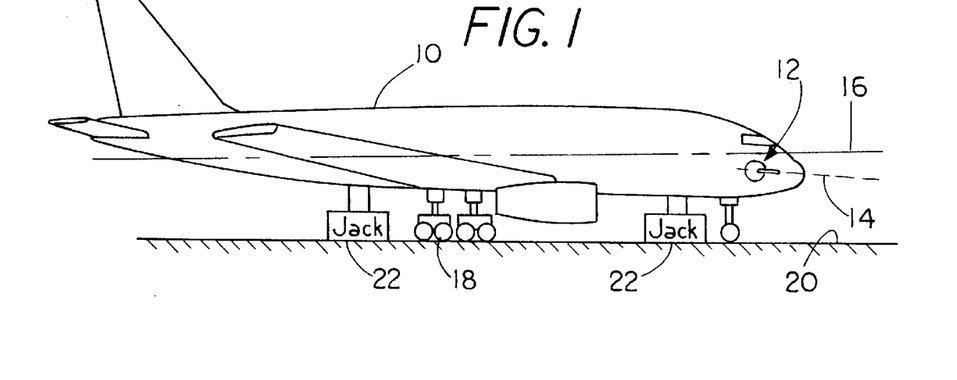
FIG. 1 is a schematic side elevational view of a typical aircraft having a probe aligned according to the present invention installed thereon.

In FIG. 1, an aircraft 10 that requires accurate air data information in flight, including pitot pressure, static pressure and aircraft angle of attack is illustrated. A multi-purpose air data sensing probe (or sensor) 12, preferably is a "Smart" probe, that is a sensing probe with a processor built into the instrumentation housing integral with the probe. The probe 12 needs to be positioned so that the axis 14 of the probe barrel is at a known angle relative to the aircraft longitudinal reference axis 16, which generally, in the alignment processes is considered to be a horizontal axis. The aircraft has suitable landing gear 18, that supports the aircraft relative to the ground line 20, but in this instance, separate jacks illustrated schematically at 22 are used for supporting the aircraft so that the axis 16 can be leveled precisely, by adjusting the jacks.

Figure 2:
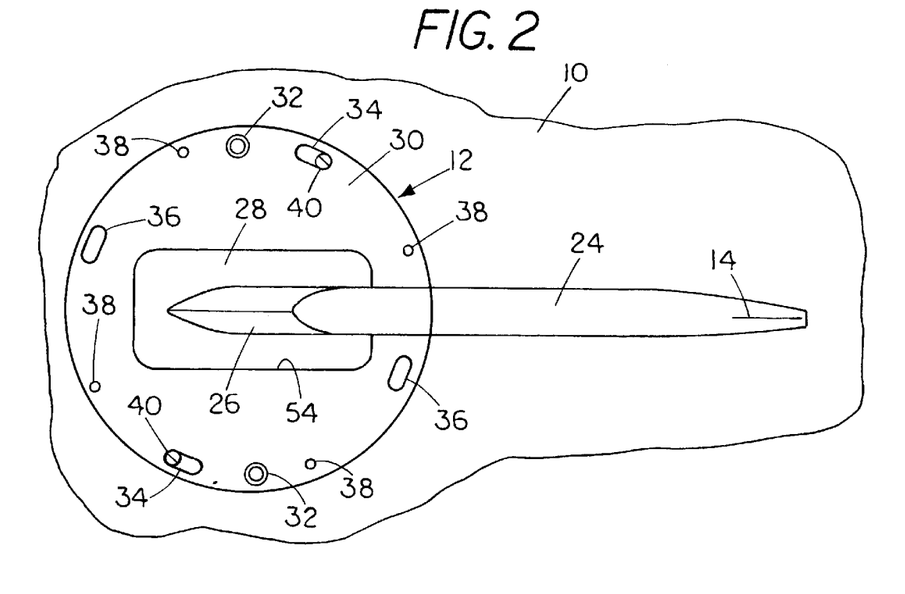
FIG. 2 is an enlarged side elevational view of a typical air data sensor probe and base plate positioned on an aircraft.
Figure 3:
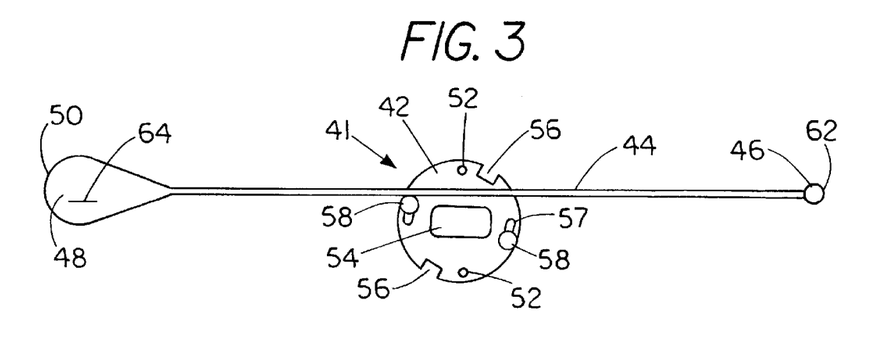
FIG. 3 is a side elevational view of an alignment tool made according to the present invention.

The air data sensing probe 12 is shown in FIG. 2 in side elevational view, before installation of the alignment tool forming part of this invention, and is illustrated schematically. The sensing probe 12 has a barrel 24 that is mounted onto a strut 26. The strut 26, in turn, has a base 28 that is supported on a probe base plate 30. The base plate 30 is circular, as shown, and is provided with a number of apertures adjacent the periphery. A pair of stainless steel inserts 32 are diametrically opposed on the top and bottom of the base plate 30. These stainless steel inserts are precisely positioned and are precisely bored so that the interior bore of the inserts are very close tolerance. Additionally, the base plate 30 is provided with a first pair of diametrically opposite first slots 34, and a second pair of slots 36, 36 that are also diametrically opposed. The radially extending bisecting lines of the respective two pairs of slots are at 90° to each other. Additionally, bores or openings 38 (four as shown) are provided at spaced intervals around the periphery of the base plate 30. When the probe 12 is first installed on an aircraft, as will be reviewed, the slots 34 are used for receiving screws indicated generally at 40, that are used for temporarily holding the base plate 30 in position so that it does not rotate under gravity, but which are not tightened fully so the probe 12 and plate 30 can be rotated manually about a horizontal axis. The base plate 30 is supported on an aircraft wall portion 31 (FIG. 4) that can be a separate aircraft wall mounting plate, but which will be considered an aircraft wall.

The alignment tool 41 of a first exemplary embodiment is shown in more detail in FIGS. 3–7, and is made with a tool base plate or tool mounting plate or flange 42 that is the same outer diameter as the probe base plate 30. The tool mounting plate 42 supports an elongated rod 44 that has a part circular disc member 46 at a leading or forward end thereof, and another larger size part circular disc member 48 at the opposite or rear end. Disc member 48 has a part circular surface 50, and is of larger size than the part spherical end member 46. Rod 44 is pinned securely to the tool mounting plate 42 in a known position with reference lines on the end members 46 and 48 precisely located relative to a pair of dowel pins 52 on the tool mounting plate. The dowel pins 52 are diametrically opposed, and are positioned adjacent the edge of the tool mounting plate 42. The dowel pins 52 protrude from the side of the tool mounting plate 42 opposite from the rod 44.

Figure 6:
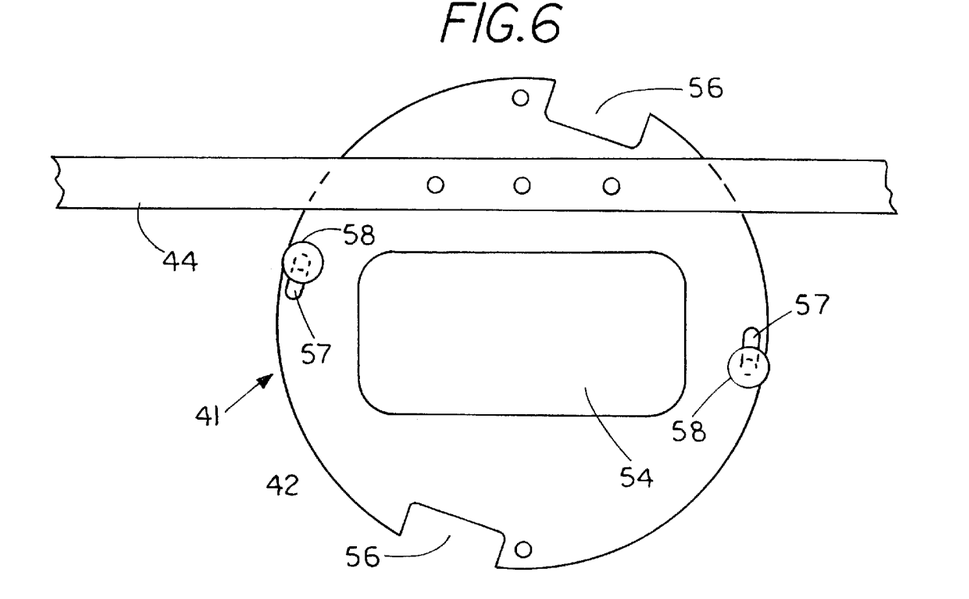
FIG. 6 is an enlarged view of the alignment tool mounting plate.

The alignment tool mounting plate 42 has a central opening 54, and also has slot clearance recesses 56, 56 extending inwardly from the edge and positioned 180° apart. The tool mounting plate 42 has short slots 57 for receiving thumb screws 58 that will align with slots 36 in the probe base plate 30, when the alignment tool 41 is installed.

Figure 4:
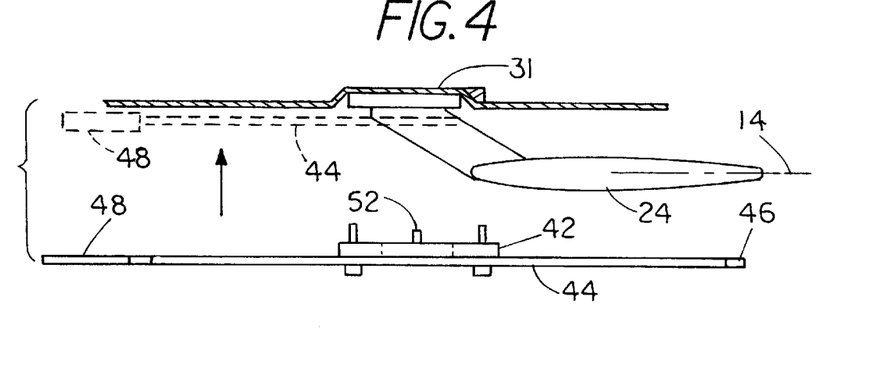
FIG. 4 is an exploded view showing an alignment tool as it is in position to be moved toward an air data sensor probe on an aircraft and installed on the sensor.
Figure 5:
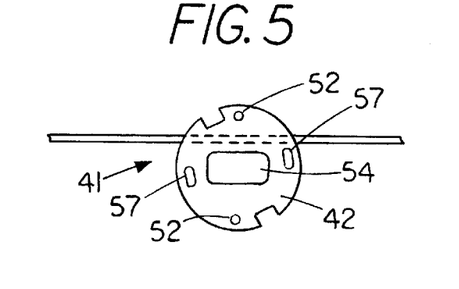
FIG. 5 is a fragmentary view of the tool mounting plate of the alignment tool taken from the side opposite that shown in FIG. 3.

The central opening 54 is of size to fit over the probe barrel 24, and the strut 26, and encircle or overlie the base 28 of the strut 26, so that the alignment tool mounting plate 42 can be placed to overlie and be contiguous with the probe base plate 30, as indicated by dotted lines in FIG. 4.

The edge recesses 56 in tool mounting plate 42 will clear the screws 40 that are used in the first set of slots 34 in the probe base plate 30, for securing the base plate temporarily, the recesses 56 permit access to screws 40 for tightening, even with the alignment tool 41 installed on the probe.

When the alignment tool 41 is put into position on the probe 12, the dowel pins 52 are inserted into the bushings 32 on the probe base plate 30, and thus the position of the alignment tool and in particular, rod 44, relative to the axis of probe barrel 24 is very precisely maintained because of the tight tolerances between the dowel pins 52 and the bores in the stainless steel inserts 32. This means that the end members 46 and 48 of the alignment tool will be at a known position relative to the axis 14 of the probe.

Figure 7:
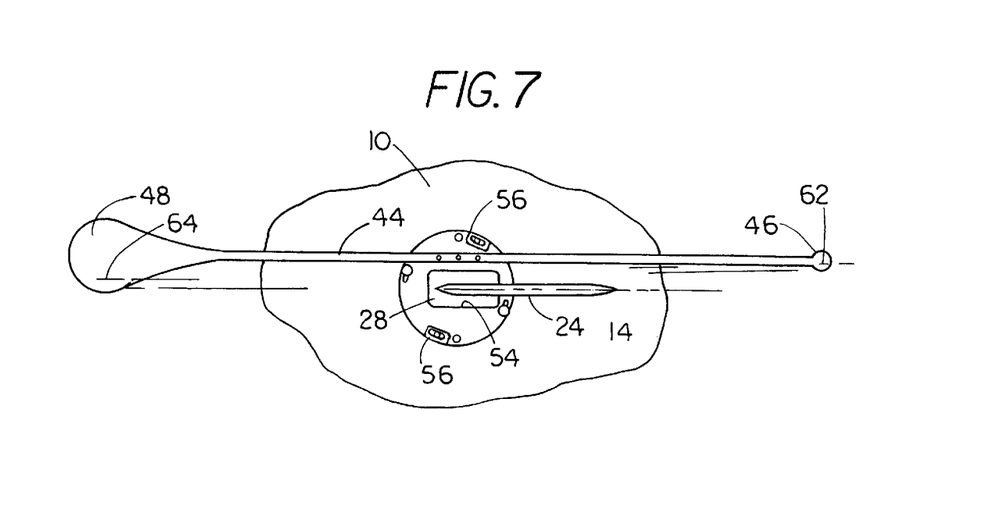
FIG. 7 is an enlarged side view of the alignment tool in position on an air data sensor.
Figure 8:
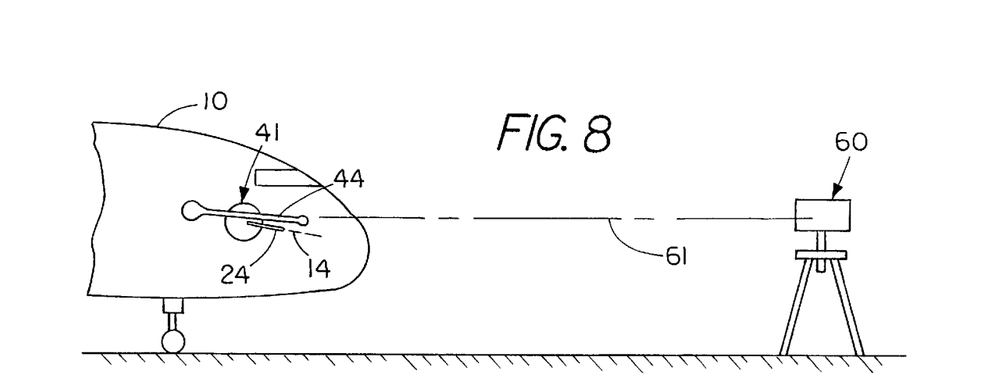
FIG. 8 is a schematic view illustrating a source of a laser beam used for leveling in a first form of the invention.

When the alignment tool mounting plate 42 is held onto the probe base plate 30 with the thumb screws 52, the level device illustrated generally at 60, in FIG. 8, which can be a laser beam 61 or an optical level, will be energized and the laser beam for example can be used for aligning with marks 62 and 64 on the end members 46 and 48, of the alignment tool 41. These marks can be precisely placed so that the line that they represent can be held exactly level, or show that the alignment tool is at an incline. Thus, the rod 44 and end members form a level and incline indicator. Additionally, the level device 60 can be an optical scope that would be used for observing the alignment tool, and alignment can be made by making the bottom points of the end members 46 and 48 tangent to the scope sight line, generally as illustrated in FIG. 7.

Once the alignment tool, and thus the probe, have been rotated to level the tool, the screws 40 for the probe base plate can be tightened to hold the probe in position. The alignment tool 24 is removed from the probe base plate 30 and the probe barrel 24 by loosening the thumb screws 58.

Specifically, after the alignment tool is removed, the two slots 36 on the probe base plate 30, forming the second pair of slots that previously received the thumb screws 58, are used for mounting screws to attach the probe base plate 30 directly to the aircraft wall portion of aircraft plate 31, and hold the probe securely. These screws are all torqued down, and a cover plate can be installed over the base plate 30. The aircraft will be flight tested, and if the flight test shows that the signals from the air data sensing probe 12 in tolerance, then the cover plate is removed, and precise diameter bores are drilled through the alignment bushings 32 into the aircraft wall portion of aircraft mounting plate 31, also, holes are drilled in the aircraft air data sensing mounting plate into the aircraft at the remaining holes 38 on the probe base plate 30.

The air data sensing probe 12 is then removed from the aircraft, and dowel pins are pressed into the aircraft mounting plate or aircraft wall in the bores aligning with the bushings 32. The dowel pins will then be positioned to slide into the bores of the stainless steel bushings 32 when the air data sensor is again replaced. Suitable interior nuts are provided at the openings in the aircraft wall or mounting plate 31 for receiving screws that will hold the probe base plate 30 in position.

The air data sensor is then put into position aligned by the dowel pins entering the bushings 32, and the base plate is secured with suitable screws. The alignment procedures for the first form of the invention is completed.

Figure 9:
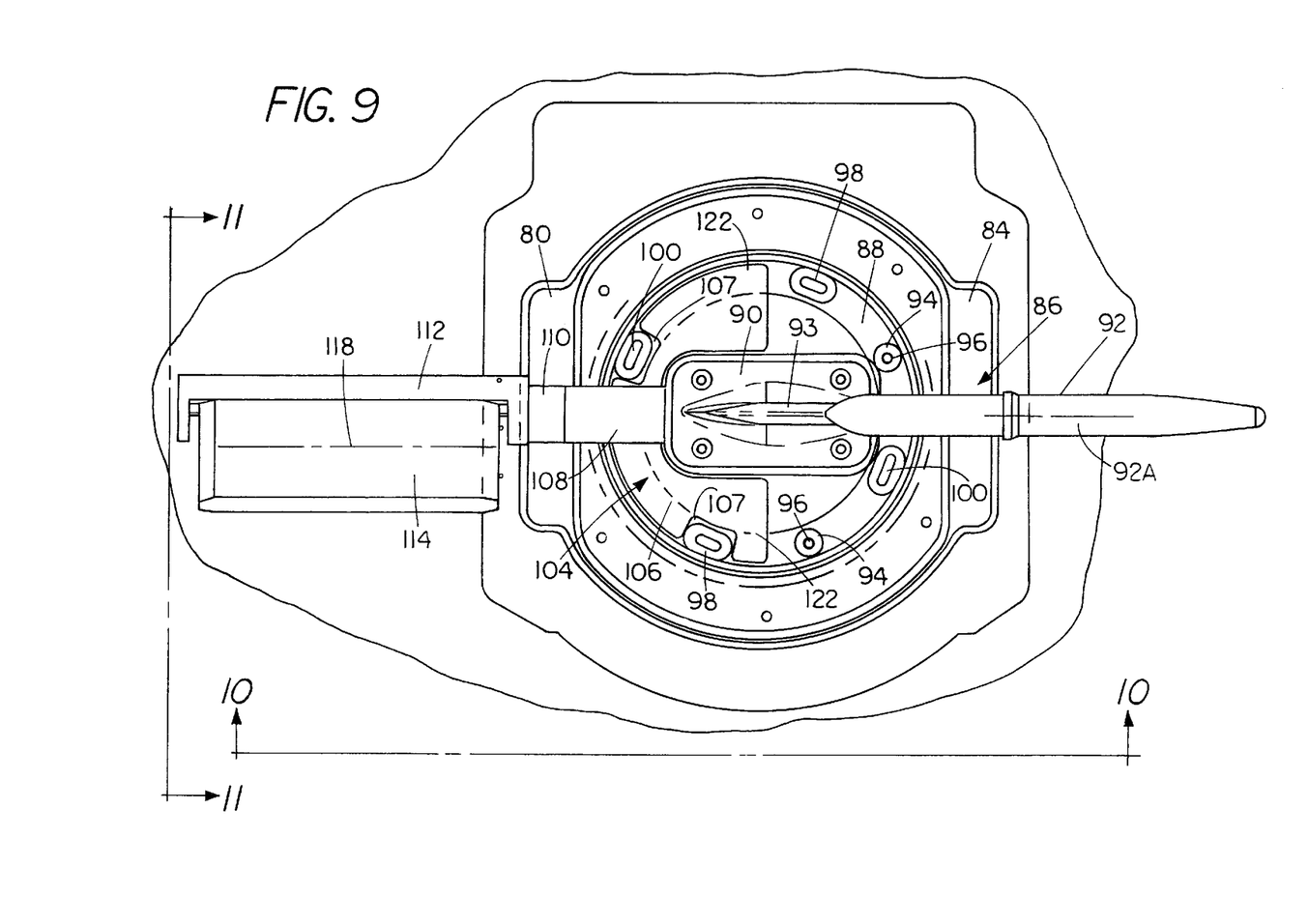
FIG. 9 is a side elevational view of an air data sensor having an alignment tool made according to the second form of the present invention installed thereon.
Figure 10:
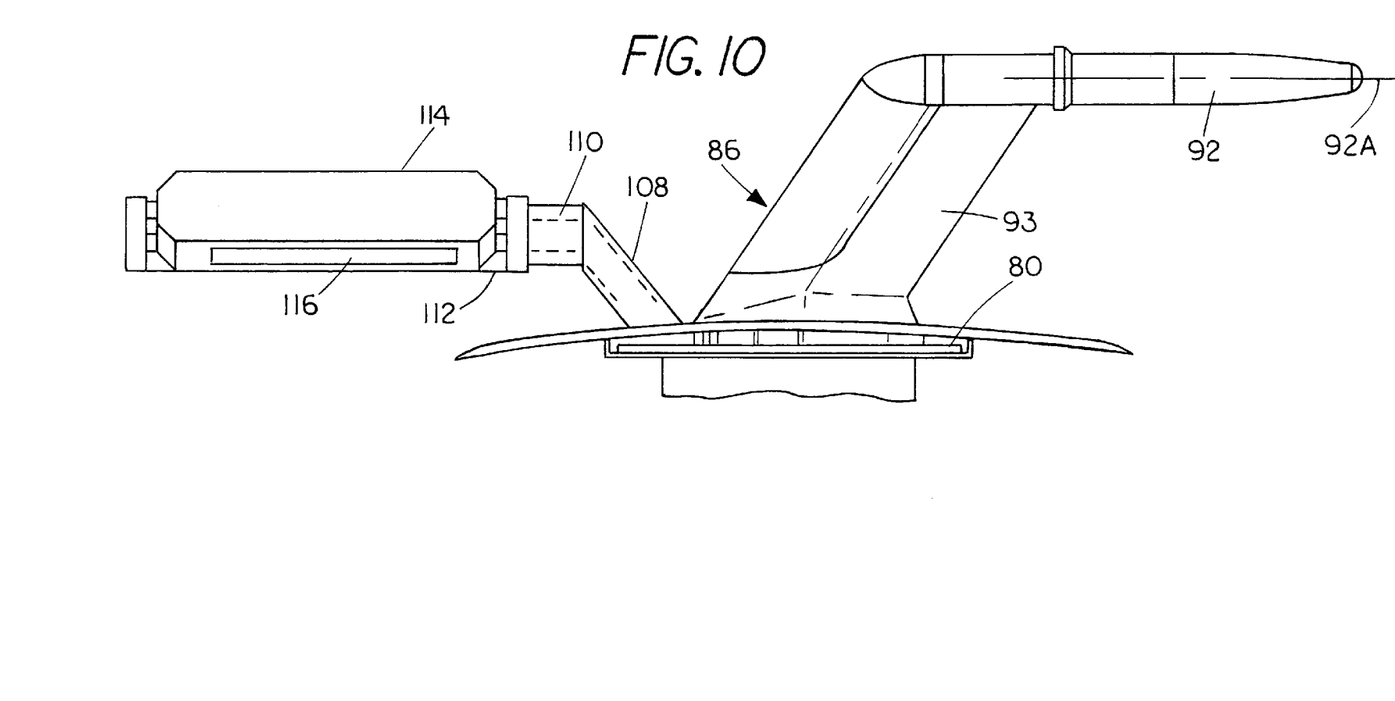
FIG. 10 is a bottom plan view of the alignment tool in FIG. 9 taken generally along the line 10—10 in FIG. 9.
Figures 11, 12:
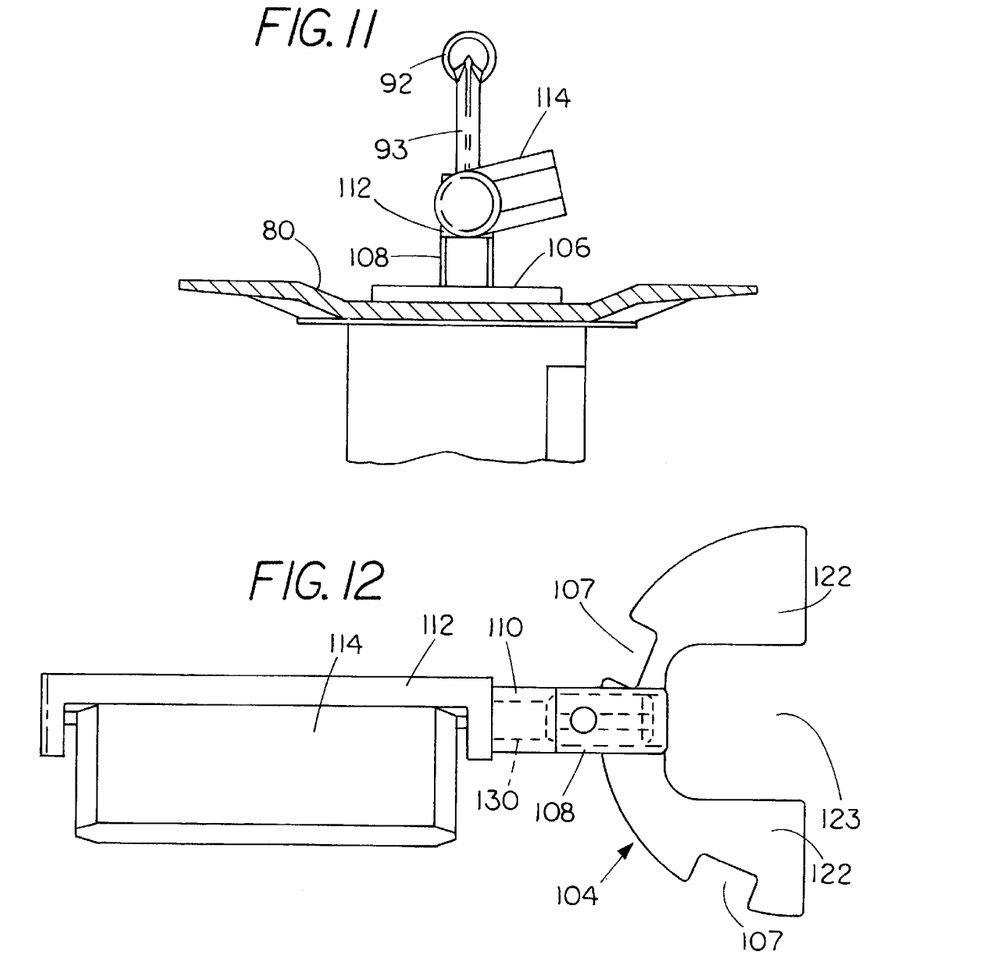
FIG. 11 is an end view taken along line 11—11 in FIG. 10.
FIG. 12 is a plan view of the alignment tool made according to the present invention shown in FIG. 9 and separated from the air data sensor.

Referring to FIG. 9, and a second form of the invention, an aircraft mounting plate 80 forms a portion of the aircraft wall. The aircraft mounting plate 80 has a recessed region 84 for receiving an air data sensor or probe assembly 86. The air data sensor assembly 86 has a probe base 90 secured to probe base plate 88. A probe barrel 92 is mounted onto the probe base 90 with a strut 93 in a normal manner. The probe barrel extends outwardly from the side of the aircraft.

In this form of the invention, the circular probe base plate 88 has a selected number of apertures adjacent to its periphery. A pair of stainless steel inserts 94, are provided in the probe base plate 88. The bores 96 of the inserts 94 are precisely sized. These bores will be used for receiving dowel pins after installation is complete. Additionally, the probe base plate 88 includes a first pair of slots 98 that are diametrically opposed, and a second pair of slots 100 which are also diametrically opposed and are centered 90° offset from the slots 98. The slots are apertures that permit rotating the probe base plate and the probe about the central axis of the base plate on fasteners extending through the slots.

Additional mounting holes can be provided in the probe base plate 88, as desired and as shown in the first form of the invention. An alignment tool 104 is used for aligning the axis 92A of the probe barrel 92 in a proper orientation relative to a level line or central longitudinal axis on the aircraft, as previously explained. Alignment tool 104 has a tool mounting plate or flange 106, and an arm 108 that is secured to the tool mounting plate. The arm 108 projects out from the tool mounting plate or flange 106. The arm 108 has a hub or socket end 110 that is cylindrical, and the hub 110 in turn has a bore that carries a mounting block 112 for supporting a digital inclinometer 114 in position. Digital inclinometers are well known, and are self-contained so that they will provide a level or inclined readout using indicia on a face indicated schematically 116 indicating that the axis of the inclinometer which is represented at 118 is level or at an incline. A PRO 3600 digital inclinometer is satisfactory, and forms a level and incline indicator.

Figure 13:
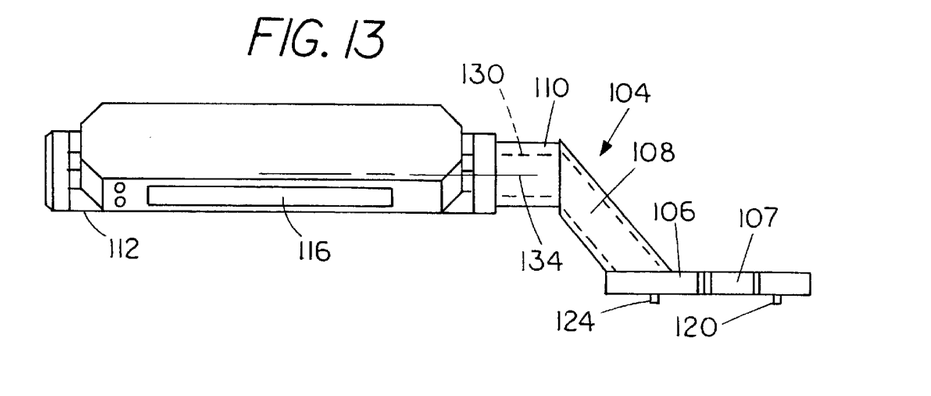
FIG. 13 is a bottom plan view taken generally along line 13—13 in FIG. 12.
Figure 14:
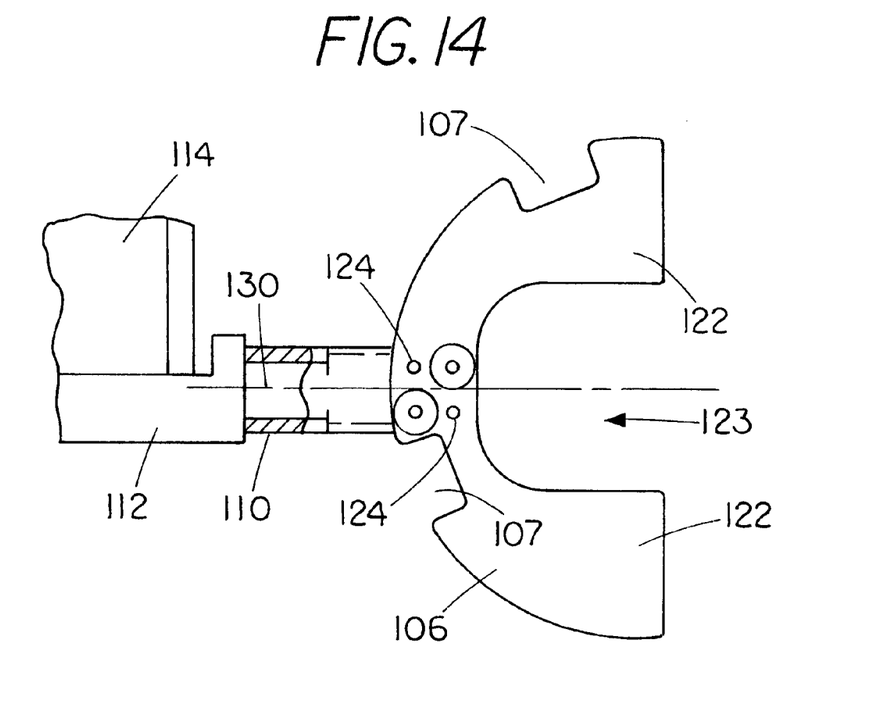
FIG. 14 is a fragmentary side view showing the opposite side of the alignment tool from FIG. 12, the side shown and illustrating alignment pins and openings for securing the alignment tool in position.

Tool mounting plate or flange 106, as shown in FIGS. 13 and 14 in particular, has a plurality of dowel alignment pins 120 and 124 that fit into provided close fitting bores on the probe base plate or mounting plate 88. The alignment pins 120 are on the outer arm sections 122 of the tool mounting plate 106, and alignment dowel pins 124 are adjacent the base portion of the tool mounting plate 106. The arm section 122 forms a central opening 123 that straddles the probe 93 strut and base 90.

The alignment pins 120 mate with and are supported in bores or guides in the probe base plate 88. Then, the tool mounting plate 106 is held in place manually. The alignment tool 104 has pins that mate with the guides or bores on the probe mounting plate so the alignment tool is held precisely at a known relationship relative to the axis 92A of the probe barrel 92.

The hub 110 that is supported on the arm 108 attached to the tool mounting plate 88 has a bore on the interior, in which a close fitting shaft member 130 of the mounting block 112 will fit. The shaft 130 can be keyed into different key ways in the bore so that the support 112 for the digital inclinometer can be rotated about a hub axis 134, which is parallel to the barrel axis 92A.

Rotation of the support 112 about the axis 134 will move the digital inclinometer 114 in the aircraft "roll" direction.

The inclinometer can be oriented appropriately for different types of air data sensors being aligned. The key slots in the hub 110 will be keyed to a particular air data sensor, so the digital inclinometer is adapted to be used with more than air data sensor.

Once the appropriate position of the digital inclinometer on the hub 110 is set, the process for aligning the air data sensor probe assembly 86 can commence.

The first step in alignment is as in the first form of the invention, leveling the aircraft so the aircraft longitudinal axis is horizontal or level. Then the air data sensor or probe assembly 86 to be aligned is placed onto the aircraft. The air data sensor assembly 86 is fastened using two fasteners, such as screws and washers in the slots 98 or other apertures that will permit rotating the probe mounting plate 88. It can be seen that the alignment tool plate or flange 106 has recesses 107 at its periphery at two locations to provide clearance for one of the slots 100 and one of the slots 98, so that screws or other fasteners can be put into place. The screws that pass through the slots 98 are threaded into the aircraft mounting plate or wall 80, tightly enough so friction will hold the air data sensor assembly 86 so that it does not rotate about a horizontal axis due to gravity. The screws are not completely tightened. The sensor assembly can be rotated by hand against the friction force, for alignment of the probe.

The alignment tool 104 is then put into place on the base plate 88, the alignment dowel pins 124 or mating members on the back side of the alignment tool are inserted into bores of bushings forming guide members on the air data sensing probe base plate 88.

The alignment tool 104 is held in place manually on the alignment dowel pins 124. The method of holding the alignment tool in place is not critical, since the alignment tool is held in its proper position by the alignment dowel pins 124, and the bores for dowel pins which comprise mating guide members.

Once the alignment tool 104 is in position, the support 112 for the digital inclinometer is rotated about its mounting on the hub 110 until it is in its proper position for the probe or sensor being aligned. The proper position can be indicated for each individual air data sensing probe on the hub 110 using a series of key ways, each of which will be for one air data sensing probe. This positioning is to ensure that the digital inclinometer 114 is level in the aircraft roll axis. A digital inclinometer or level is an electrical device, and it is turned on by pressing an on/off button right on the housing.

The probe base plate 88, and thus the probe barrel 92 mounted thereon, is rotated about the pitch axis (perpendicular to the longitudinal plane) using a tool, or by hand, until the digital inclinometer indicates the barrel axis 92A is in the desired aligned position. It is to be noted that "aligned" does not mean the probe axis parallel to the longitudinal axis. The inclinometer will not only indicate that its axis is level, but also will indicate the number of degrees its axis is inclined from level. Thus the inclinometer can indicated the desired angle the probe axis it deviated from horizontal. Generally the probe tip inclines downwardly slightly. The two fasteners that were used for initial installation of the probe base plate are then tightened to hold the probe base plate, and the probe in position. The position of the digital inclinometer is then verified, and if the probe barrel is still aligned, the alignment tool 104 is removed and all the fasteners for the probe base plate are tightened down.

A cover plate is put over the probe base plate 88 and the aircraft is flight tested or operated to verify the operational accuracy of the probe. If the operational tests show the air data sensing probe assembly 86 is within tolerance, the cover plate is removed, and using the installed air data sensing probe base plate 88 as a guide or mask, holes are drilled through the probe base plate 88 and into the aircraft mounting plate or wall 80. The bores 96 in the alignment bushings 94 are used as guides for precisely forming bores for dowel pins or alignment guides in the aircraft wall. Other mounting holes for fasteners to hold the probe mounting plate 88 are then also drilled into the aircraft wall or mounting plate for permanent installation of the probe base plate 88. Dowel pins are pressed into the aircraft mounting plate 80 in the bores formed to align with the stainless steel bushings. A nut carrying plate for speed nuts or the like is installed on the interior of the aircraft wall, so that screws and washers can be placed into all of the holes that are used for mounting the plate 88A. The air data sensing probe 86 is then secured. The cover plate is then installed and the probe alignment procedure is completed.

Although the present invention has been described with reference to preferred embodiments, workers skilled in the art will recognize that changes may be made in form and detail without departing from the spirit and scope of the invention.

What is claimed is:

1. An apparatus for use in combination with an air data sensing probe having a probe base plate and a probe barrel having a central axis to be aligned with respect to an axis of an aircraft, the probe base plate having a positioning guide thereon and being adjustably securable to an aircraft to change an angle between the probe barrel central axis and the axis of an aircraft, the apparatus comprising an alignment tool having a tool mounting plate sized to overlie at least a portion of the probe base plate of the air data sensing probe, a mating member on the tool mounting plate to mate with the positioning guide on the probe base plate, an angle indicator mounted on said tool mounting plate at a selected known position relative to the central axis of the probe barrel when the tool mounting plate is mounted with the mating member mating with the positioning guide, the probe base plate being securable on an aircraft with the angle indicator positioned at an angle relative to a level position, and the tool mounting plate being removable from the probe base plate.

2. The apparatus of claim 1 wherein the probe base plate has apertures extending annularly about a position axis about which the base plate is movable for changing the angle, said apertures being of size to receive fasteners to support the probe base plate relative to an aircraft.

3. The apparatus of claim 2 wherein the positioning guide comprises at least one bore in the probe base plate, and the mating member on the tool mounting plate comprises a dowel pin that is received in the bore.

4. The apparatus of claim 3 wherein the fasteners comprise threaded fasteners that pass through slots on both the tool mounting plate and probe base plate and which are threadable into an aircraft wall.

5. The apparatus of claim 1 wherein said level indicator comprises an elongated alignment member that has end portions which have level indication indicia at opposite ends thereof.

6. The apparatus of claim 5 wherein the elongated alignment member end portions both comprise at least part circular surfaces that are of larger dimension than the rest of the elongated member.

7. The apparatus of claim 6, wherein one of said end members on the elongated member is larger diameter than the other.

8. An alignment tool for permitting alignment of an air data sensing probe having a probe axis and which is mountable on an aircraft, said alignment tool comprising a tool mounting plate of size to mount onto a probe base plate of an air data sensing probe, said tool mounting plate having at least one first member adapted to mate with a second reference member on such probe base plate, a level and incline indicator mounted on the tool mounting plate and having indicia to indicate an angular position of the level and incline indicator relative to a level plane, and to indicate when an axis of a probe on a probe base plate on which the tool mounting plate is placed, with the first reference member mating with a second reference member on such probe base plate, is at a known position.

9. The alignment tool of claim 8 wherein the level and incline indicator comprises an elongated member supported on the tool mounting plate and extending parallel to a plane of the tool mounting plate, the tool mounting plate having a pair of dowel pins, one of which comprises the at least one first reference member receivable in bores on the probe base plate, one of the bores comprising the second reference member, and the elongated member having reference marks at opposite ends of the elongated member establishing a line at a known relationship to a line between the dowel pins on the tool mounting plate.

10. The alignment tool of claim 8 wherein the level and incline indicator comprises a digital inclinometer directly indicating inclination relative to a horizontal plane.

11. The alignment tool of claim 8 wherein the level indicator comprises a pair of marking lines carried on a member forming part of a tool plate assembly, the marking lines establish a reference axis when lying on the same level sight line.

12. The alignment tool of claim 8 wherein the mounting plate has slots for receiving fasteners to support the tool mounting plate in position on an aircraft with the tool mounting plate overlying a probe base plate of a probe on the aircraft, the slots permitting the tool mounting plate and the probe base plate to rotate about a central axis to orient the reference line relative to a level plane with the fasteners loosened to permit manual movement of the air data sensing probe.

13. An apparatus for use in combination with an air data sensing probe having a probe base plate, a probe barrel on the base plate and having a central axis to be aligned with an axis of an aircraft, and the probe base plate having at least a pair of part annularly extending slots adjacent a periphery thereof for receiving fasteners that mount to a mounting plate in the aircraft, and the probe base plate further having at least a pair of guide bores defined therein, the apparatus comprising an alignment tool having a tool mounting plate sized to overlie at least portions of the probe base plate, said tool mounting plate having a pair of dowel pins to fit into the alignment bores provided on the probe base plate, the probe base plate being manually rotatable relative to an aircraft in a mounting position a level and incline indicator mounted on said tool mounting plate, and oriented so that when the level and incline indicator is at a known relation to a level plane determined by moving the probe base plate while guided by fasteners in the slots, the probe is properly aligned with the axis of the aircraft.

14. The apparatus of claim 13 wherein the tool mounting plate has edge recesses aligned with the slots in the probe base plate, the slots in the probe base plate thereby being accessible for permitting fasteners to be tightened to secure the probe base plate onto an aircraft mounting plate with the tool mounting plate in position with the dowel pins in the bores on the probe base plate.

15. The alignment tool of claim 13 wherein said tool mounting plate has an opening in the center portions thereof to permit the tool mounting plate to be installed on a probe base plate having an air data sensing probe supported on the probe base plate.

16. A method of aligning an air data sensing probe relative to an aircraft axis that is positioned at a first reference angle, the aircraft having an aircraft mounting plate for receiving a probe base plate of an air data sensing probe, with fasteners passing through the probe base plate into the aircraft mounting plate, and wherein an alignment tool is coupled to the probe base plate at a known position, such that a reference axis on the alignment tool is at a known relationship to an axis of the probe, the method comprising supporting the probe base plate on the aircraft mounting plate in a temporary position, providing a level and angle indicator on the alignment tool, rotating the probe base plate and the alignment tool to a known position of the level and angle indicator relative to the axis of the aircraft, securing the probe base plate to the aircraft mounting plate, and removing the alignment tool.

17. The method of claim 16 including forming bores in the aircraft mounting plate through openings in the probe base plate after securing the probe base plate to establish a fixed reference position of the bores relative to the air data sensing probe, and inserting dowels in the formed bores and in the openings of the probe base plate.

18. The method of claim 17 including the step of temporarily securing the alignment tool to the aircraft mounting plate as the probe base plate and alignment tool are rotated.

19. The method of claim 17 including providing dowel pins on one of the alignment tool, and probe base plate and providing close fitting bores for the dowel pins on the other of the alignment tool and probe base plate, and fixing the position of the alignment tool relative to the probe base plate by placing the dowels in the close fitting bores.

20. The method of claim 17 including verifying the alignment of the air data sensing probe by use, and determining that the level and incline indicator indicated that the probe base plate remains at the fixed reference position.

21. Apparatus for use with an air data sensing probe having a probe base plate, and a probe barrel mounted on a strut laterally from the base plate and having a central axis to be aligned with respect to an axis of an aircraft, the probe base plate being adjustably securable to an aircraft, the apparatus comprising an alignment tool having a tool mounting plate sized to overlie at least a portion of a base plate of an air data sensing probe on which the alignment tool is to be mounted, and provided with an opening therethrough for receiving a strut with a probe barrel on an exterior of the tool mounting plate, a reference member on the tool mounting plate adapted to mate with a positioning guide on such probe base plate, an angle indicator mounted on said tool mounting plate at a selected known position relative to the reference member, and fasteners to removably secure the tool mounting plate to an associated probe base plate, and separately to secure such probe base plate to an aircraft with the angle indicator positioned at a known angle relative to a level position, the tool base plate being configured to provide access to fasteners to adjustably secure an associated base plate to an aircraft.

* * * * *